United States Patent

[11] 3,583,582

| [72] | Inventor | William A. Ostarello |
| | | Chicago, Ill. |
| [21] | Appl. No. | 855,522 |
| [22] | Filed | Sept. 5, 1969 |
| [45] | Patented | June 8, 1971 |
| [73] | Assignee | FMC Corporation |
| | | San Jose, Calif. |

[54] BUCKET TYPE BARGE UNLOADER
10 Claims, 6 Drawing Figs.

[52] U.S. Cl. .................................................. 214/14, 198/77
[51] Int. Cl. ............................................... B65g 63/00
[50] Field of Search ........................................ 214/10, 14, 15 C, 15 D

[56] References Cited
UNITED STATES PATENTS
1,829,923   11/1931   Coce ............................ 214/10X
3,104,766   9/1963   Sasad .......................... 214/14

FOREIGN PATENTS
182,636   7/1922   Great Britain ................ 214/14
49,541   6/1921   Sweden ........................ 214/14

*Primary Examiner*—Gerald M. Forlenza
*Assistant Examiner*—Frank E. Werner
*Attorneys*—F. W. Anderson and C. E. Tripp

ABSTRACT: A barge unloader is provided with two endless chain bucket elevators mounted on a vertically adjustable platform and a carriage, that raise and lower the elevators and traverse them as a unit across a longitudinally moving barge. The elevator buckets are mounted on bar link chains which hang in a catenary loop below the carriage, allowing the buckets to scrape the deck of the barge. A chain tensioning device automatically adjusts the catenary span and takes up chain slack when the bucket elevators are lowered to and supported by the barge deck.

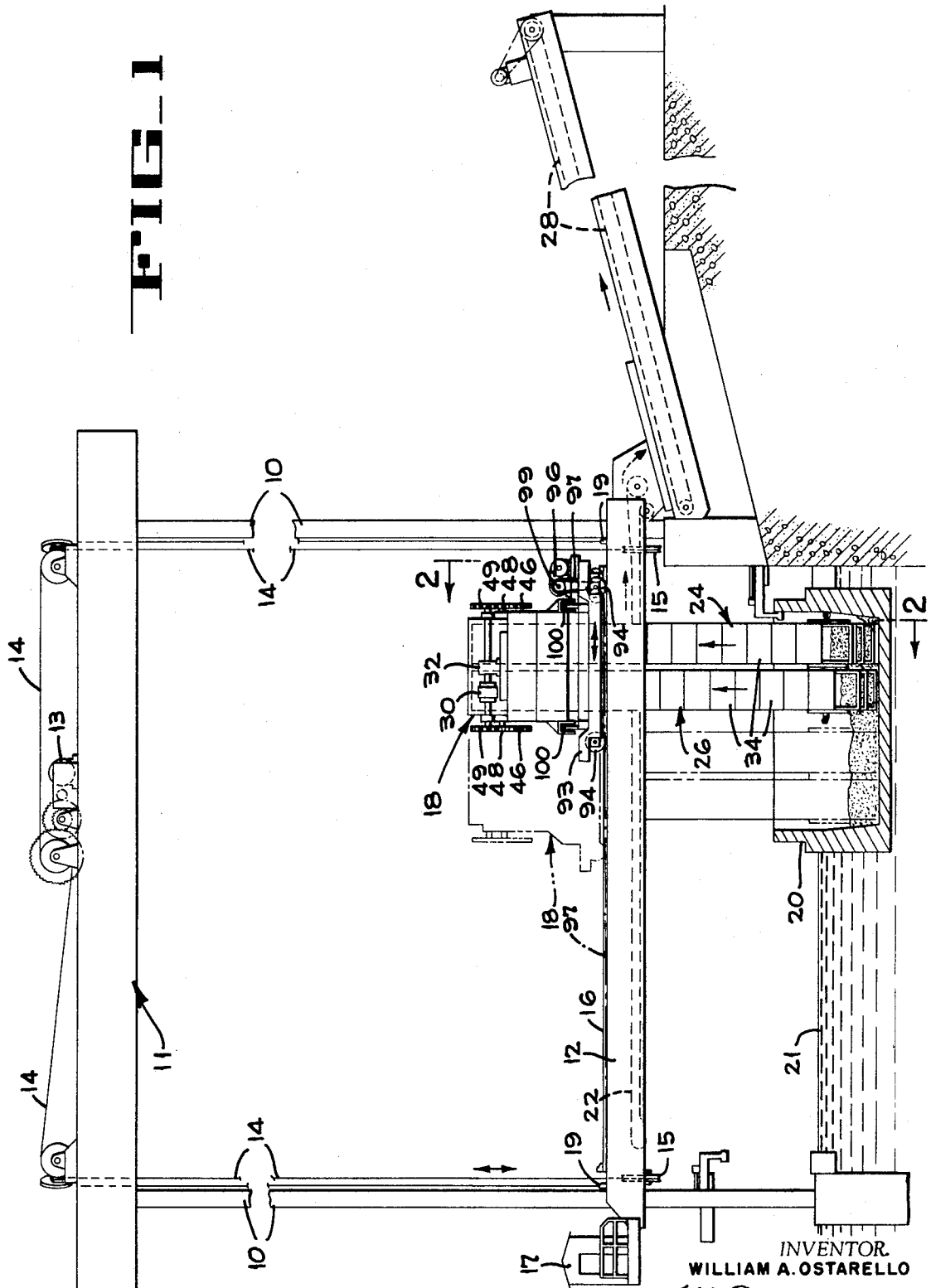

FIG_2
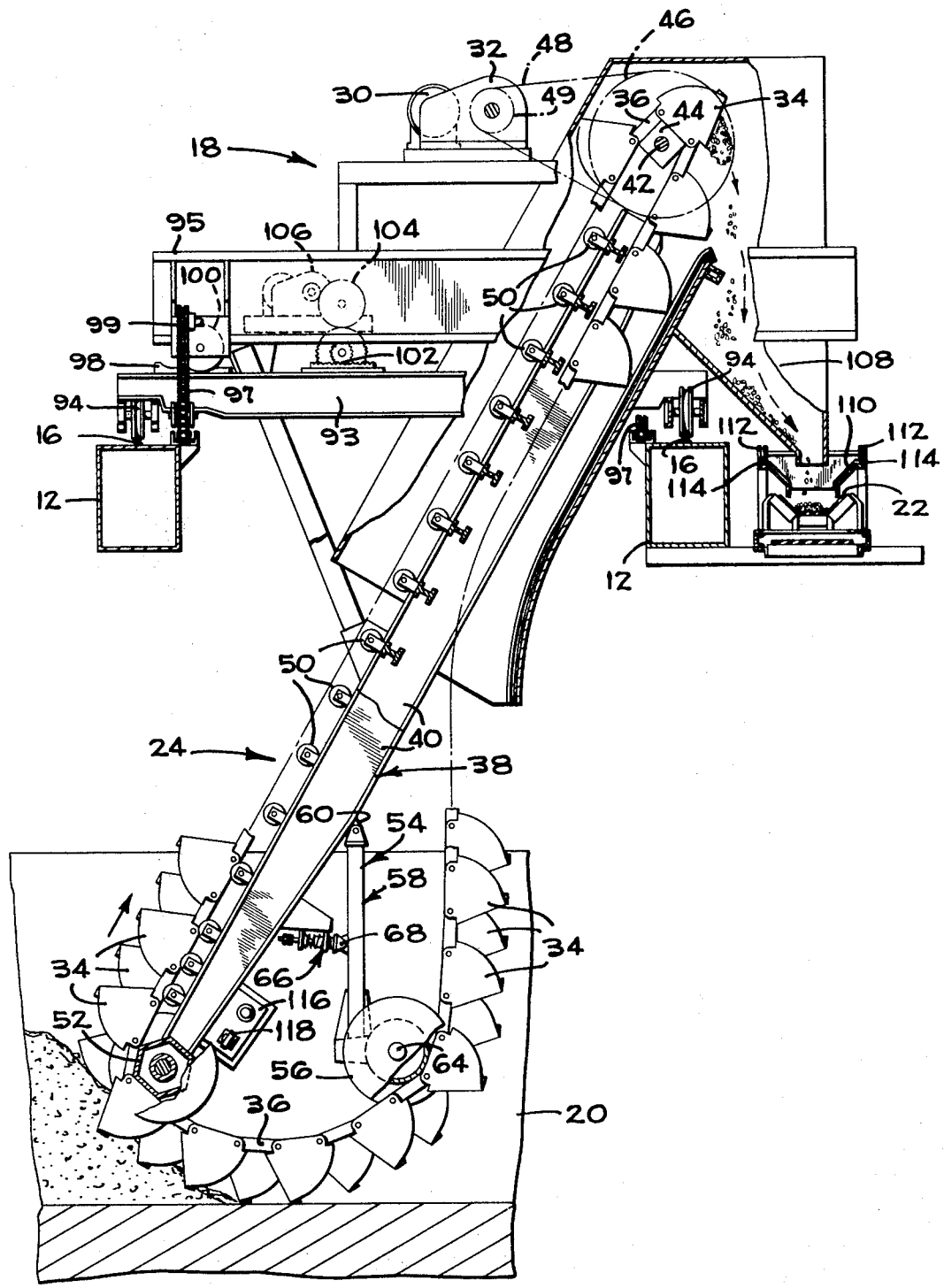

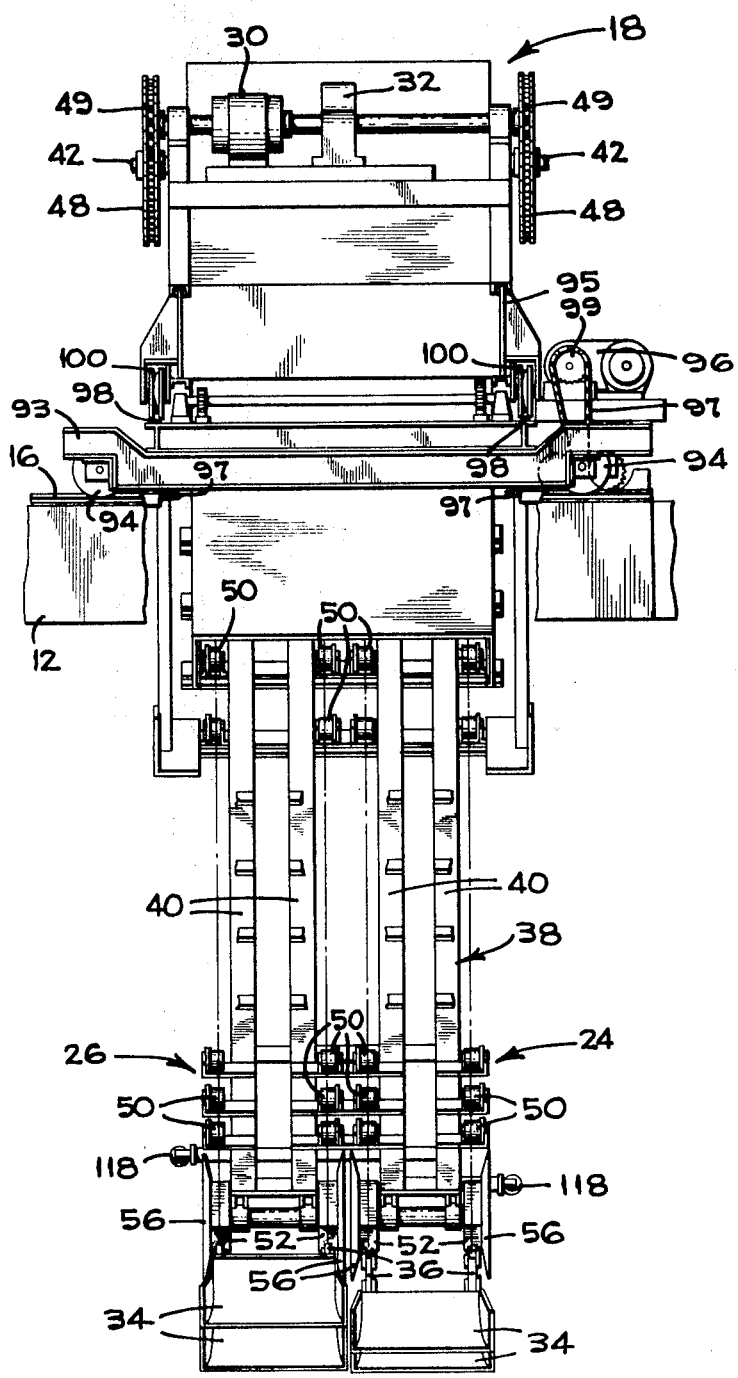

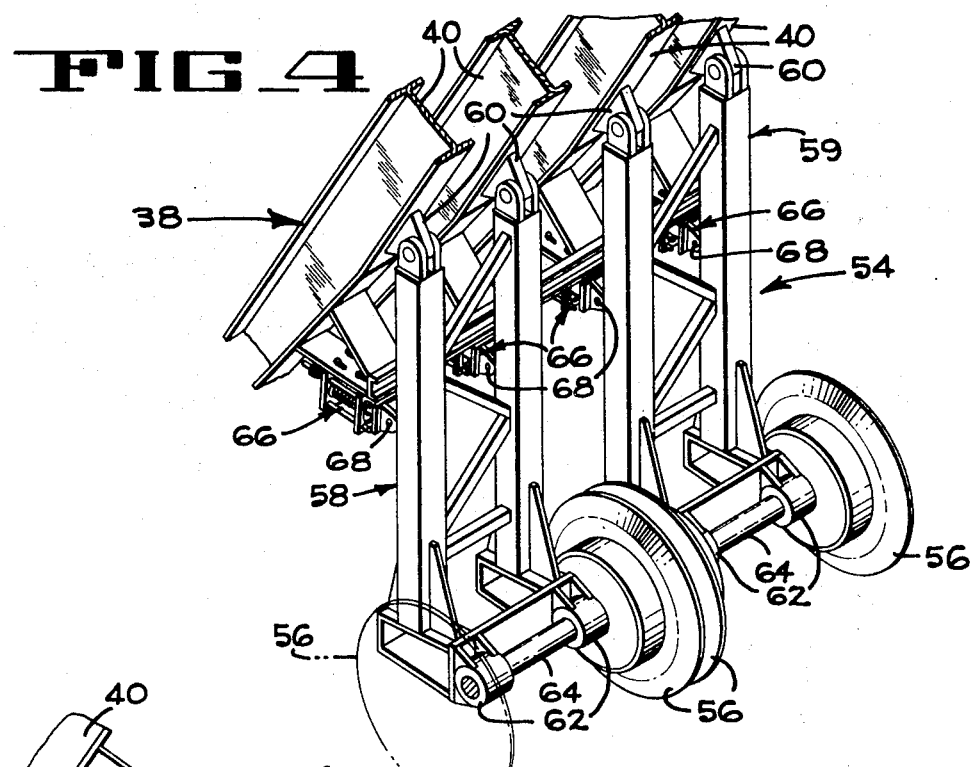
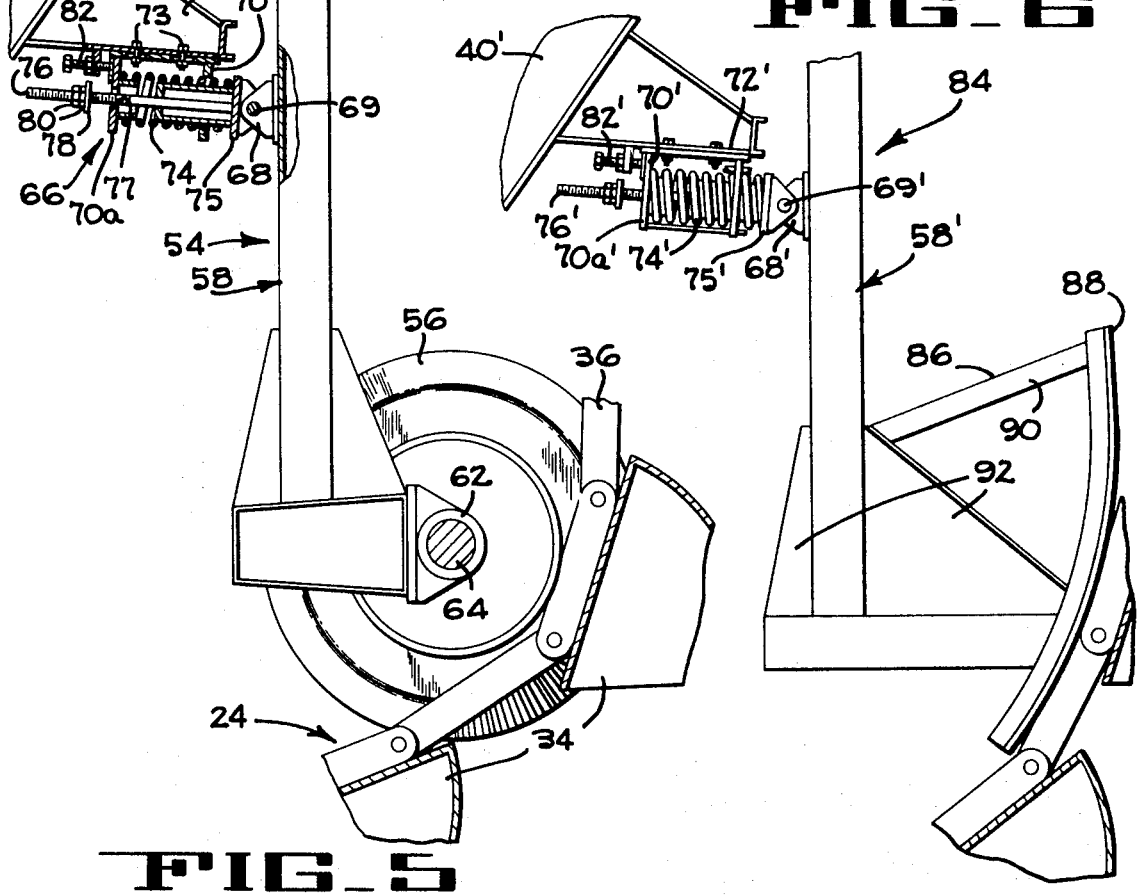

BUCKET TYPE BARGE UNLOADER

BACKGROUND OF THE INVENTION

1. Field of the Invention

The present invention relates generally to reclaimers but more specifically relates to bucket-type reclaimers used for unloading grain or coal laden barges.

The barge unloaders are used to remove grain, coal or similar material from a barge and stockpile the material on adjacent land.

For years the only practical high capacity method for unloading these barges was the unloading tower with cable-operated grab buckets. This type of unloader, although refined over the years, has approached its practical limits of speed and capacity.

In an effort to increase speed and capacity, belt conveyor unloaders were developed which were provided with digging heads that could be lowered into the barge to move the transported material onto the belt conveyor whereupon it was removed from the barge and stockpiled elsewhere. The belt-conveyor-type unloaders were an improvement over the grab-bucket-type unloader but they did not have the speed or the capacity to fulfill modern day demands.

Presently, the most efficient barge unloader is of the bucket elevator type wherein an endless chain of buckets scoop material out of the barge and elevate it onto a belt conveyor which transports it to a stockpiling area.

A prevalent problem with conventional bucket-elevator-type unloaders is maintaining the proper amount of tension in the chains which link the buckets to the drive motor. Due to the immense size of the buckets and the chains, and due to the slack that develops in the chains when the buckets scrape and are supported by the deck of the barge, it is necessary to provide a chain tensioning device that is big and strong enough to cope with the tremendous size and weight of the chains and buckets and yet capable of maintaining the buckets in proper digging position for efficient removal of material.

2. Description of the Prior Art

A typical belt-conveyor-type barge unloader is disclosed in US. Pat. No. 2,173,177 issued to F. C. Menk on Sept. 19, 1939. The unloader there disclosed consists of two independently movable belt conveyors, each equipped with a digger head to move material onto the movable conveyor which in turn deposits the material onto a third conveyor that delivers the material to other belt conveyors for transporting to stockpiles on adjacent land.

A bucket-elevator-type unloader is disclosed in U.S. Pat. No. 3,356,232 issued to W. L. Price et al. on Dec. 5, 1967. This unloader comprises two endless chains of buckets which are movable relative to each other so that they move toward or away from each other continuously along the length of a barge on paths that are transverse to the length of the barge. The material picked up by the buckets is dumped onto one of a series of belt conveyors which transport the material away from the barge.

Typical of devices for maintaining the tension in a chain is the device shown in U.S. Pat. No. 415,001 issued to H. S. Smith on Nov. 12, 1889. There, a weight and bellcrank are used to urge a chain engaging sprocket wheel against the chain so as to keep it tight on the remaining sprocket wheels.

SUMMARY OF THE INVENTION

The bucket-type barge unloader of the present invention includes a carriage mounted for universal movement on a vertically adjustable platform so that in effect the carriage is reversibly movable along three mutually perpendicular axes. Two endless lines of buckets are mounted on the carriage, the buckets of each line being tied together at both sides by endless linked bar chains which are coupled through a reducing unit to a drive motor mounted on the carriage. Each line of buckets depends from the carriage in a catenary loop and can be lowered by the vertically adjustable platform into the material-occupied confines of a barge.

The upper runs of the bucket lines are adjacent a collector conveyor belt disposed on the adjustable platform so that material lifted out of the barge by the buckets can be emptied onto the conveyor belt and transported to a series of conveyor belts and thence to a stockpiling area.

Also, the unloader includes a variable speed barge puller system which progressively moves the barge past the lower ends of the bucket lines.

The material carried by the barge is generally heaped high to define a pile having its crest along the centerline of the barge. To remove the material, a first pass of the barge is made with the two lines of moving bucket elevators positioned side by side at the barge centerline, the lower end of the lines being at an elevation to dig out a portion of the material as the barge is pulled thereunder. After the first cut is completed, the bucket lines are raised out of the barge and the barge puller system is reversed to return the barge to its original position. The bucket lines are then again lowered while digging, until the hanging buckets engage the deck of the barge. An automatic traversing motion of the carriage is then started and, as the barge moves longitudinally thereunder, the two bucket lines travel as a unit back and forth across the barge, removing the remainder of the material. When the buckets have completed their traversing movement, only a very small amount of material remains in the barge—so little that manual cleanup is unnecessary.

The carriage is designed so that its cycle of travel is synchronized with the longitudinal movement of the barge thereunder. It has drives and carriage tracks for both crosswise and lengthwise travel on its support, so that the carriage can move a small amount longitudinally at the same time it moves transversely. This oblique movement of the carriage relative to its support enables the buckets on the carriage to make neat parallel cuts in the material as they move across the barge.

Side detectors located on the outside edges of the bucket elevators stop the transverse motion of the carriage when it reaches the side of the barge so that the carriage can be longitudinally indexed before beginning a reverse movement. Another important feature of the unloader is a chain tensioning device which provides at the lower ends of the bucket lines a modified catenary loop of predetermined depth and span when the bucket lines are freely digging, and then automatically adjusts when the bucket line is lowered to and supported by the barge deck. It is designed to provide sufficient tension to take up the chain slack as the chain-bucket catenaries become supported by the barge bottom in the final cleanup pass. It is also designed to maintain smooth tracking of the chains around the fixed sprockets which support one side of the catenary while this tensioning device adjusts the other side.

Accordingly, it is an object of the present invention to provide a fast and efficient barge unloader.

Another object is to provide a barge unloader wherein the load is distributed between two separate bucket lines which cooperate as a unit to elevate the material in the barge to a belt conveyor for transportation away from the barge.

Another object is to provide a bucket-type barge unloader wherein two endless bucket lines are mounted to move back and forth across the width of the barge as the barge is pulled longitudinally thereunder.

Another object is to provide a bucket-type barge unloader that is adapted for crosswise and lengthwise travel so that the carriage upon which the buckets are mounted can move a small amount longitudinally at the same time it moves transversely so as to enable the buckets to make parallel cuts in the material carried by the barge as the barge moves longitudinally thereunder.

Another object is to provide a barge unloader which has a bucket supporting carriage that traverses back and forth across the width of the barge as the barge moves longitudinally thereunder and which has side detectors to stop and reverse the transverse movement of the carriage when it reaches a side of the barge.

Still another object is to provide a chain tensioning device for a barge unloader that maintains the lower run of the bucket lines in a catenary loop of predetermined depth and span when the bucket lines are freely digging.

Still another object is to provide a chain tensioning device for a barge unloader that automatically adjusts the span of the catenary loop of the bucket lines when the bucket lines are partially supported by the barge deck and maintains smooth tracking of the lines around their drive and guide sprockets.

The manner in which these and other objects of the invention may be obtained will be apparent from the following detailed description and the accompanying drawings.

BRIEF DESCRIPTION OF THE DRAWINGS

FIG. 1 is a schematic front elevational view of the barge unloader in operable relationship with a barge shown in vertical section.

FIG. 2 is an enlarged schematic side elevation of the carriage and bucket elevators of the barge unloader taken looking in the direction of arrows 2-2 of FIG. 1, parts being broken away. FIG. 3 is an enlarged schematic front elevation of the carriage and bucket elevators of the barge unloader with parts being broken away.

FIG. 4 is an enlarged fragmentary isometric view of the chain tensioning device with a chain engaging wheel removed for clarity.

FIG. 5 is an enlarged fragmentary schematic side elevational view with parts broken away of the chain tensioning device.

FIG. 6 is an enlarged fragmentary schematic side elevational view of a second embodiment of the chain tensioning device.

DESCRIPTION OF THE PREFERRED EMBODIMENTS

The barge unloader of the present invention is mounted on two vertical elevating towers 10 (FIG. 1) which are separated a sufficient distance to enable a barge or barges to move between them. The towers support and provide guidance for a vertically adjustable horizontal platform 12. The platform 12 can be raised or lowered by an overhead gantry crane 11 which is driven by a motor 13 and operably connected to the platform 12 by cable 14, pulleys 15, and cable end anchors 19. The operation of the gantry crane is controlled from the control station 17, as are the remaining functions of the unloader. The platform 12 has a set of carriage tracks or rails 16 (FIG. 2) on which a carriage 18 is mounted for transverse movement in relation to a barge 20 (FIG. 1) disposed in a body of water 21 beneath the unloading apparatus.

Mounted on the platform 12 adjacent and parallel to the carriage tracks 16 is a conventional collector conveyor belt 22 (FIG. 2). The collector conveyor belt 22 receives material removed from the barge 20 by a pair of closely juxtaposed bucket line elevators 24 and 26, and deposits the material on a pivoted follower conveyor belt 28 (FIG. 1), which carries it away from the apparatus.

The closely juxtaposed bucket line elevators 24 and 26 are driven by the same motor 30 through the same gear reducing unit 32 and in essence function together as a single unit. Each bucket line is identical to the other and each line includes a series of very large metal digging buckets 34, over 4½ feet in breadth, which are linked together in an endless line by two endless link chains 36. The buckets in the separate lines are staggered so that only one bucket is dumping material onto conveyor belt 22 at any one time. It should be emphasized that even though the bucket line elevators 24 and 26 function as a single unit, they are independently mounted to distribute evenly between the two lines the total load assumed by the unloading apparatus.

The chains 36 of the bucket lines 24 and 26 are mounted on a rigid frame, generally designated 38, including four I-beams 40 (FIG. 3) that are secured to and angularly depend from the carriage 18. Journaled in the upper ends of the I-beams are two separate drive shafts 42, one associated with each of the bucket lines 24 and 26 and each shaft having a pair of square drive sprockets 44 fixedly secured thereto. The drive shafts 42 are operably connected to the motor 30 and gear reducer unit 32 through two outside toothed sprockets 46, secured to the drive shafts 42, and link chains 48 which are trained over the toothed sprockets 46 and also over toothed sprockets 49 on the reducer unit shaft.

The upper portions of the four endless chains 36 are trained over the square sprockets 44 while the forward upward run of the chains slidably rest on rollers 50 (FIGS. 2 and 3) mounted on the upper longitudinal edge of the I-beams 40. At the lower end of the I-beams there are four freely rotating hexagonal sprockets 52, one each for supporting the four chains 36 associated with the bucket lines 24 and 26. Rearwardly of the hexagonal sprockets 52 (or to the right as seen in FIG. 2), a chain tensioning unit 54, FIGS. 2, 4 and 5, is secured to the frame 38. This unit includes four freely rotating flanged guide wheel members 56 which are spring biased against the chains 36 in a manner to be described more fully below.

In summary, the closed loop of each of the four bucket supporting chains 36 passes over a square drive sprocket 44 at the top of the loop, a freely rotating guide wheel 56 at the lower rearward portion of the loop, a freely rotating hexagonal guide sprocket 52 at the lower forward portion of the loop, and rollers 50 on the forward upward moving portion of the loop. The freely rotating hexagonal guide sprockets 52 and the guide wheels 56 maintain the lower runs of the chains, and therefore, the buckets 34 supported thereby, in a modified catenary loop when the chains are hanging freely.

When the buckets 34 are lowered a sufficient distance so that they engage and are partially supported by the deck of a barge therebeneath, there is a tendency for slack to develop in the two bucket lines raising the possibility of slippage thereof. To counteract this tendency and to broaden the catenary span when the bucket lines contact the deck of the barge, the chain tensioning device 54 of the present invention is provided.

The chain tensioning apparatus 54, as best seen in FIGS. 4 and 5, is a large spring-biased device disposed inside the closed loop of the chains 36 and in outwardly directed, forceful engagement with the chains. It consists of two identical and independent frame members 58 and 59 (FIG. 4) rotatably secured to the longitudinal underside of beams 40 by brackets and pins 60. The lower end of frames 58 and 59 contain bearings 62 in which wheel supporting shafts 64 are journaled for free rotation. The chain engaging guide wheels 56 are secured to the outer ends of the shafts 64 and rotate therewith as the bucket lines move around in their closed loops. The wheels 56 are flanged for better guidance of the chains 36.

A pair of compression spring mechanisms 66 are operably connected to each of the frames 58 and 59 about midway down their length by other brackets 68 and pins 69. The compression spring mechanism is inherently expansible to maintain the chain engaging wheels in forceful contact with the chains 36 even when there is a tendency for slack to develop in the chains, as when they are partially supported by the deck of the barge. These compression spring mechanisms could, however, be replaced by conventional and expansible pneumatic, electric, or hydraulic mechanisms, that perform the same function, without departing from the spirit of the invention. The spring mechanisms 66 include a spring housing 70, that is adjustably secured to an arm 72 rigidly depending from an I-beam 40, by means of fasteners 73 that pass through slots in the housing 70. A compression spring 74 extends between a plate 70a of housing 70 and a plate 75 which is pivoted to the bracket 68, the ends of the spring being disposed on cylindrical guides secured to the plates. The springs 74, thus mounted, urge the frames 58 and 59 in a counterclockwise direction as viewed in FIG. 5, to counteract the clockwise urging that is exerted on the frames by the bucket lines that are trained around the wheels 56.

A threaded rod 76, secured to the plate 75 of each spring mechanism and passing through the longitudinal center of the spring 74 and the cylindrical guides, prevents the frames 58 and 59 from rotating too far in a counterclockwise direction and possibly pulling the spring 74 out of the housing 70. The rod 76 passes through an aperture 77 in the wall 70a of the housing 70 and has an enlarged washer 78 and two nuts 80 adjustably threaded thereon so that, when a frame 58 or 59 is rotated in a counterclockwise direction, the enlarged washer 78 will abut against said wall and prevent any further movement of the frame in that direction.

An adjustment screw 82 on each spring mechanism is provided to manually preset the mechanism in accordance with the tension desired in the bucket lines.

An alternative embodiment of a chain tensioning device is shown in FIG. 6 and is designated 84. It is similar to the device shown in FIGS. 4 and 5 with identical parts of the second embodiment given the same reference numeral with a prime suffix. Instead of the freely rotating wheels 56, the device 84 is provided with a pair of chain abutting rigid shoe members 86 on a frame 58' that is biased against the chains 36. It is to be understood that a second frame (not shown) corresponding to the frame 59 will also be provided with a pair of chain abutting rigid shoe members. Each shoe 86 consists of a curved chain engaging rail 88 rigidly affixed to the frame 58' by struts 90 and webs 92. The frame 58' has two of such shoes, one for tensioning each of the chains 36 associated with the adjacent bucket line.

As stated above, the carriage 18 is mounted on rails 16 for movement transversely across the width of a barge as best seen in FIGS. 1 and 3. The carriage has an underframe 93 and an upper frame 95, the underframe 93 having four flanged supporting wheels 94 that ride on the rails 16. The underframe 93 is driven by a reversible drive 96 that operatively cooperates in a conventional manner with a pair of chains 97, inwardly adjacent and parallel to the rails 16, so that drive sprockets 99 (only one being shown), coupled to the drive 96 and engaged with the chains 97, will move the carriage along the rails 16.

The underframe 93 carries four short rails 98, two of which are not shown, fixedly mounted thereon so as to lie perpendicular to the rails 16 on the platform 12. The upper frame 95 is movably mounted on these rails 98 via flanged wheels 100 so that it can be moved a short distance longitudinally in relation to the barge. The longitudinal movement is effected by a rack and pinion 102 operably connected through gear train 104 to a motor 106 (FIG. 2). The purpose for both transverse and longitudinal movement of the carriage will become clear with the description of the operation of the apparatus below.

As seen in FIG. 2, as the buckets 34 pass over the square drive sprocket 44 at the top of the closed loop, material which was scooped out of the barge 20 by the buckets is emptied into a chute 108 affixed to the carriage, and passes through a movable hopper 110 onto the collector conveyor belt 22. The movable hopper 110 is mounted on rollers 112 and rides along a stationary channel 114 which runs longitudinally above the conveyor belt 22 to guide removed material onto the collector belt. The open lower end of the chute 108 extends downwardly into the movable hopper 110 and moves longitudinally of the conveyor belt 22 along with hopper 110. The open lower end of the chute 108 is also free to move back and forth across the width of the conveyor belt 22 within the hopper 110 as the carriage moves short distances longitudinally of the barge on tracks 98. Therefore, no matter where the carriage 18 is located, the material scooped up by the buckets will always be deposited through chute 108 into hopper 110 and thus onto collector belt 22.

To limit movement of the carriage 18 as it moves transversely across the width of the barge 20, side detector switches 116 are mounted near the lower end of I-beams 40 (FIGS. 2 and 3) on the outside edges thereof. The detector switches 116 are of the type wherein rollers 118 on the end of a plunger engage the sides of the barge as the carriage moves toward that side forcing the plunger inwardly to actuate the switch. When the switch is actuated it stops the drive 96 to prevent any further transverse movement of the carriage.

In operation, a barge is moved between the towers 10 so that its longitudinal edge is parallel to the adjacent dock. Most barges are 35 feet in width but can be as narrow as 26 feet and as wide as 50 feet. Inasmuch as the towers are spaced approximately 75 feet apart, two barges, depending on their size, could be stationed between the towers at the same time if desired, so that after one has been unloaded the carriage could be moved over to the other without wasting time to remove an empty barge and move in a new full barge. When the barge is being moved into place or before the carriage is moved into an operable position, the platform 12 is raised by means of the crane 11 so as to be clear of the barge and the material therein. Once the barge is in place and ready to be unloaded, the platform 12 is lowered, lowering the bucket lines into the material laden confines of the barge at the upstream end of the barge where the digging is to begin.

It should be noted that the barge, when in position is connected to a conventional reversible barge puller system that is operable from the control station 17 to move the barge upstream or downstream along the barge's length.

Since the material is normally heaped high in the barge, with its crest along the centerline, the first pass, when unloading the normal 35-foot barge, is a simple cut, with the carriage held stationary at the barge centerline and lowered to dig out one-half to two-thirds of the material. The operator controls the speed of the barge movement, usually about 5 f.p.m., to obtain maximum capacity, determined by the width of the barge and condition of the material.

After the first cut is completed, the buckets are raised out of the barge and the barge haul system is reversed. In reverse, the barge can be accelerated up to 100 f.p.m. as it is returned to its starting position. The elevator is then lowered while digging, until the hanging buckets engage the deck of the barge. The automatic traversing system is then started by starting drive 96 and motor 106, and as the barge moves upstream, the bucket lines travel back and forth across the barge, removing the remainder of the material as best shown in FIG. 1 by phantom line representation.

The carriage is designed so that its cycle of travel is synchronized with the upstream rate of speed of the barge. In other words, as the barge moves upstream and as the carriage traverses the barge, the carriage also moves upstream a small distance along tracks 98. This longitudinal movement of the carriage, independent of the barge, enables the unloader to make neat parallel cuts in the material on lines perpendicular to the longitudinal axis of the barge thus avoiding diagonal cuts that would possibly leave material in the barge.

When the bucket lines reach the side of the barge, the side detector switch 116, associated with that side, engages the sidewall of the barge and stops the drive 96 and motor 106 to prevent any further traversing and longitudinal movement of the carriage. The barge puller is also stopped and the motor 106 is then reversed to index the carriage longitudinally, i.e., move the carriage downstream and back to its longitudinal beginning position. It should be noted that the longitudinal movement of the carriage is limited to only about 2 feet, so the indexing procedure is very quick.

After the carriage is indexed, the drive 96 is reversed to drive the carriage back across the width of the barge, the barge puller is started to pull the barge upstream and the motor 106 is again reversed to move the carriage longitudinally upstream to enable the buckets to make another parallel transverse cut. This procedure is repeated until the bucket lines reach the downstream end of the barge whereupon the platform 12 is raised drawing the buckets out of the empty barge.

As was mentioned above, the following conveyor belt 28 is pivoted so that as the platform 12 is raised and lowered, conveyor belt 28 will always be retained in a position to receive material being deposited thereon at the inland end of collector conveyor belt 22. Thus retained, no matter how high or low the platform 12, the conveyor belt 28 will continually be operable to transfer material to some inland location where it can either be stockpiled or removed by other means.

If after a first barge is emptied there is another barge between the towers waiting to be emptied the carriage can be driven over to and above the second barge by drive 96 to commence unloading that barge before the empty barge is removed from between the towers.

Although the best mode contemplated for carrying out the present invention has been herein shown and described, it will be apparent that modification and variation may be made without departing from what is regarded to be the subject matter of the invention.

What I claim is:

1. A barge unloading apparatus comprising in combination: a tower structure under which a barge, having longitudinal and transverse axes, is supported for longitudinal movement, a horizontal platform mounted on the tower for vertical movement and extending over the barge, means for effecting vertical movement of said platform, a carriage mounted on said platform for reversible movement along axes that are parallel to the longitudinal and transverse axes of the barge, means for reversibly driving said carriage longitudinally and transversely of the barge, two endless chain bucket elevators depending from the carriage in a closed loop and means for driving the said elevators, and means for collecting material from both of said elevators regardless of the position of the carriage.

2. The apparatus of claim 1 wherein the said endless chain bucket elevators hang from the carriage in a catenary loop.

3. The apparatus of claim 1 wherein the said two endless chain bucket elevators are closely juxtaposed and mounted on the same frame to move together as a single unit.

4. The apparatus of claim 1 wherein the two endless chain bucket elevators are each trained around a drive sprocket and at least one guide sprocket and hang from the carriage in a catenary loop.

5. The apparatus of claim 4 further including a chain tensioning device in operable engagement with both of said chain bucket elevators to take up slack in the said elevators and to maintain smooth tracking of the chains around the said sprockets.

6. The apparatus of claim 5 wherein the said chain tensioning device is expansibly biased against the chain bucket elevators.

7. The apparatus of claim 6 wherein the said chain tensioning device is disposed inside the said closed loop to exert outward force on the said chain bucket elevators.

8. The apparatus of claim 7 wherein the said chain tensioning device comprises two independently suspended frame members each supporting a chain engaging member.

9. The apparatus of claim 8 wherein the said chain engaging member comprises a freely rotating shaft with flanged guide wheels secured thereon in alignment with the chains of one of said chain bucket elevators.

10. The apparatus of claim 8 wherein the said chain engaging member comprises a pair of curved rails rigidly affixed to the said frame member in alignment with the chains of one of said chain bucket elevators.